(12) United States Patent
Everhart

(10) Patent No.: US 7,726,261 B2
(45) Date of Patent: Jun. 1, 2010

(54) ANIMAL HARNESS

(76) Inventor: Donna G. Everhart, HC3 Box 550-L, Payson, AZ (US) 85541

( * ) Notice: Subject to any disclaimer, the term of this patent is extended or adjusted under 35 U.S.C. 154(b) by 639 days.

(21) Appl. No.: 11/670,246

(22) Filed: Feb. 1, 2007

(65) Prior Publication Data

US 2007/0175407 A1 Aug. 2, 2007

Related U.S. Application Data

(60) Provisional application No. 60/766,649, filed on Feb. 2, 2006.

(51) Int. Cl.
*A01K 27/00* (2006.01)
(52) U.S. Cl. ..................... 119/795; 119/771
(58) Field of Classification Search ............... 119/795, 119/797, 798, 784, 787, 771
See application file for complete search history.

(56) References Cited

U.S. PATENT DOCUMENTS

| | | | | |
|---|---|---|---|---|
| 2,790,418 A | * | 4/1957 | Boling | 119/816 |
| 3,189,003 A | * | 6/1965 | Canfield | 119/784 |
| 4,522,153 A | * | 6/1985 | Vander Horst | 119/799 |
| D309,092 S | * | 7/1990 | Dege et al. | D8/331 |
| 5,080,045 A | * | 1/1992 | Reese et al. | 119/795 |
| D337,396 S | * | 7/1993 | Werner | D30/153 |
| 5,551,379 A | * | 9/1996 | Hart | 119/771 |
| 5,647,303 A | * | 7/1997 | Deioma | 119/864 |
| 5,718,190 A | * | 2/1998 | Tinker | 119/771 |
| 5,813,368 A | * | 9/1998 | Rasmussen | 119/799 |
| 6,247,428 B1 | * | 6/2001 | Mireles | 119/795 |

OTHER PUBLICATIONS

Larz Equipment Leashes for Multiple Dogs, http://www.larzequipment.com/multple_dog_leashes.html.

* cited by examiner

*Primary Examiner*—Yvonne R. Abbott

(57) ABSTRACT

A harness apparatus that facilitates proximity control over two or more animals by the animal handler via a single leash. The single leash couples to the harness via a first swiveling connection. Two or more animals may then be attached to the harness via two or more swiveling connections. The swiveling action of each swiveling connection virtually eliminates the possibility of animal entanglement within the harness by allowing the harness to swivel in a direction that tracks the movement of the harnessed animals. The rigidity of a cross member of the harness maintains a minimum separation distance between each animal that is attached to the harness.

20 Claims, 4 Drawing Sheets

ANIMAL HARNESS

This application claims the benefit of U.S. Provisional Application No. 60/766,649, filed Feb. 2, 2006, the content of which is incorporated herein by reference in its entirety.

FIELD OF THE INVENTION

The present invention generally relates to animal harnesses, and more particularly, to animal harnesses capable of controlling multiple animals with a single leash or lead.

BACKGROUND OF THE INVENTION

Domesticated animals have been a part of society for centuries. What began as a need to utilize animals to perform labor oriented tasks on farms, ranches, etc. has evolved into obtaining ownership of animals for the mere enjoyment and companionship they offer. Thus, pets such as dogs, cats, monkeys, ferrets, horses, etc., have been domesticated to facilitate a mutually fulfilling relationship for both pet and owner.

Domestication of animals for pets, however, adds additional responsibilities to the pet owner. In particular, while the pet owner enjoys the company of his or her pet(s) in a public atmosphere, they must also provide a measure of containment for their pets. One traditional method of containment used by pet owners is to control the movement of their pets with a leash, which allows the pet to freely roam within close proximity to the pet owner. Once the pet has roamed to a maximum distance from its owner, tension in the leash prevents roaming of the pet beyond the maximum distance.

Attachment of the leash to the pet has traditionally been facilitated by a harness, such as a collar or halter. A collar is a device that wraps around the pet's neck and provides a coupling assembly, such as a hook or loop, to facilitate attachment of the leash to the collar. Such an attachment is further facilitated by a clip that is attached to the leash, such that the clip may be mechanically attached to the collar's hook to allow the pet owner to obtain proximity control over his or her pet.

A halter operates similarly, except that the halter mounts to the animal's muzzle, or chest. In such an instance, the pet owner may obtain proximity control without necessarily tugging at the pet's neck. Instead, proximity control may be obtained by applying pressure to the animal's muzzle, or chest, via the attachment of the leash to the halter.

In the past, proximity control over a single pet using a leash/harness assembly has been successful. Many pet owners, however, own two or more pets, which requires a separate leash/harness assembly for each pet, given that the pet owner wishes to establish proximity control over all pets at the same time. Requiring the pet owner to handle multiple pets with multiple leashes can become unwieldy under certain circumstances. If the pets tend to cross each other's path during a walk, for example, then the pet owner is forced to deal with leash entanglement, while at the same time attempting to maintain proximity control over his or her pets.

Some harness/leash assemblies are intended for multiple pets, whereby each pet's leash attaches to a common coupling point. The pet owner may then obtain proximity control over each pet by attaching his or her leash to the common coupling point to create a tandem assembly for multiple pets. Such tandem assemblies, however, are traditionally non-rigid and do not provide a minimum separation distance between each pet. As such, a substantial possibility exists that the pet owner may lose control of his or her pets. A substantial possibility also exists that each pet may become entangled within the tandem assembly.

Efforts continue, therefore, to provide a leash/harness assembly that facilitates proximity control of two or more pets, maintains a constant separation distance between the two or more pets, and substantially eliminates the possibility of entanglement of the pets within the leash/harness assembly.

SUMMARY OF THE INVENTION

To overcome limitations in the prior art, and to overcome other limitations that will become apparent upon reading and understanding the present specification, the present invention discloses a harness apparatus that facilitates proximity control over two or more pets simultaneously. The harness apparatus further provides a constant separation distance between each pet and substantially eliminates the possibility that the two or more pets become entangled during operation.

In accordance with one embodiment of the invention, an animal harness comprises a cross member having a length, a plurality of pet couplers that are attached to the cross member in a first orientation along the length of the cross member, a pet handler coupler that is attached to the cross member in a second orientation at a midpoint of the length of the cross member, and a swiveling clip mechanism that is attached to the plurality of pet couplers. The first and second orientations of the pet couplers and pet handler couplers, respectively, are diametrically opposed to each other.

In accordance with another embodiment of the invention, a multiple animal harness assembly comprises a rigid cross member, a plurality of pet couplers that are attached to the rigid cross member, a plurality of swiveling clip mechanisms that are attached to each of the plurality of pet couplers, a pet handler coupler that is attached to a midpoint of the rigid cross member, and a leash having a first end that is coupled to the pet handler coupler. The rigid cross member is adapted to rotate about a hub established at the first end of the leash.

BRIEF DESCRIPTION OF THE DRAWINGS

Various aspects and advantages of the invention will become apparent upon review of the following detailed description and upon reference to the drawings in which.

DETAILED DESCRIPTION OF THE DRAWINGS

Figure 1A:
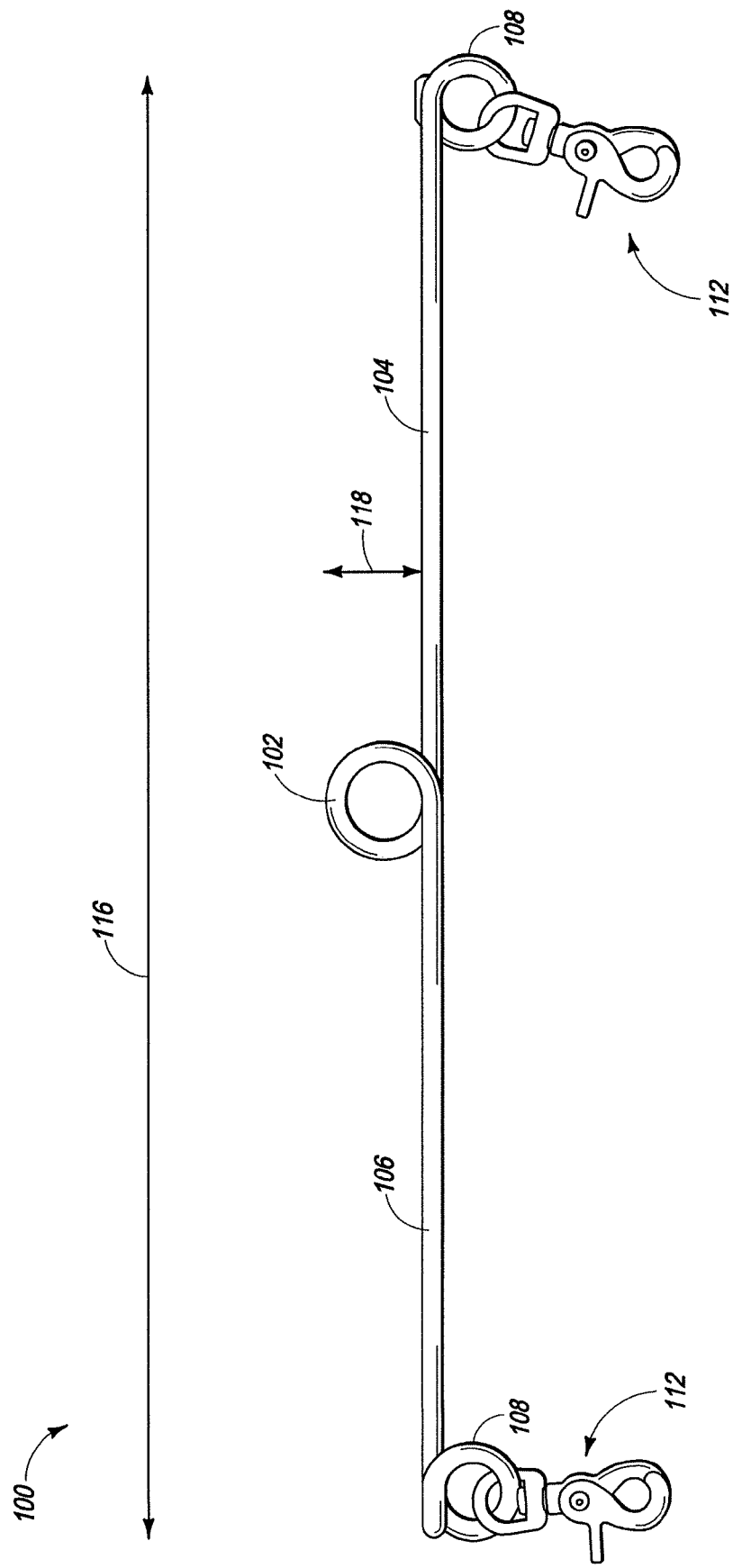
FIG. 1A exemplifies a rigid harness.

Generally, the present invention is applied to a harness apparatus that facilitates proximity control over two or more animals by the animal handler via a single leash. In particular, the owner of two or more pets is able to maintain a maximum separation distance between herself and each pet using a single leash, while maintaining a minimum separation distance between each pet and simultaneously precluding the possibility that one pet will become entangled with another.

In one embodiment, the harness is constructed of a rigid material that facilitates swiveled coupling between the pet handler's leash and the harness, whereby the pet handler's coupler is attached to a midpoint of a cross member of the harness. Swiveled coupling is also facilitated between the harness and each pet, whereby a plurality of pet couplers are similarly attached at various points along the cross member of the harness.

Each coupler is configured to accept a swiveling clip mechanism. As such, a swiveling connection between the harness and the pet owner is maintained at the pet handler's coupler. A swiveling connection between the harness and each pet is also maintained at each of the plurality of pet couplers that are attached to the harness.

The swiveling connection at each pet coupler allows a degree of freedom for each pet that is coupled to the harness. That is to say, in other words, that the pet is free to move within a multi-dimensional space that is centered at the pet's coupler.

When two or more pets are connected to the harness, a distinct possibility exists that one pet may choose to interfere with the other pet(s) and vice versa. For example, one pet may choose to cross over into the walking path of another pet. Such a maneuver is tolerated by the harness, since the harness virtually eliminates the possibility of entanglement of the pets, while maintaining a controlled separation between them. That is to say in other words, that the swiveling connection at the pet handler's coupler accounts for such a cross over maneuver, by allowing the harness to correct for the cross over condition.

In operation, a pet owner may establish a swiveling connection between herself and the harness via a leash. Similarly, the pet owner may establish swiveling connections between each pet coupler and each pet. While out for a walk, each pet may be leading the pet owner along a walking path, whereby each pet generally flanks each other pet that is attached to the harness.

Should the pets suddenly exchange positions, the swiveling connection at the pet handler's coupler allows the harness to rotate its position with respect to the changing positions of each pet, so as to track each pet's movement while providing separation control between. In such an instance, the pet owner is not required to correct for the movement of the pets, since the harness is capable of automatically rotating 360 degrees in any direction. Furthermore, since each pet is further connected to the harness via a swiveling connection, entanglement of the pets within the harness is virtually eliminated.

As discussed above, the rigid harness is configured to maintain a constant separation distance between each animal harnessed, whereby the amount of separation distance that is required depends upon the size of the animals harnessed. The pet owner, therefore, must select the size of the harness that is compatible with the size of each animal.

For example, should the pet owner wish to harness two or more small sized pets, such as Chihuahuas or dachshunds, then the separation distance between each pet may be spaced to, e.g., 12 inches, by appropriately spacing the pet couplers that are positioned along a cross member of the harness. If the pet owner wishes to harness larger pets, on the other hand, then the pet owner simply selects a harness having a wider separation distance between each pet coupler. It should be noted that the rigidity of the harness should be set so as to maintain a substantially constant distance between each pet coupler. That is to say, for example, that while the harness may be allowed to flex slightly under load, the harness should quickly return to its un-flexed configuration, whereby the original separation distance between each pet coupler is restored.

The harness may also be gauged so as to accommodate larger pets. That is to say, in other words, that the strength of the harness may be increased by increasing the gauge of material used to manufacture the harness. In one embodiment, for example, a ⅜" cylindrical steel rod may be used to fashion a harness for smaller pets. A ½" cylindrical steel rod, on the other hand, may be utilized to fashion a harness for larger pets. Still larger pets may necessitate a harness fashioned from ⅝" cylindrical steel rod. It is understood that other thicknesses of material may be selected as necessary.

Other materials, such as aluminum or hard plastics, may also be used to fashion the harness if minimizing the weight of the harness is desired. While cylindrically shaped rods may be used to fashion the harness, it is understood that alternate shapes, such as square or triangular shaped rods, may also be used. Alternately shaped rods may also be required, for example, in order to alter certain characteristics, such as the bend or flex resistance, of the harness.

In other embodiments, the number of pets harnessed may be increased to more than two. Three pets, for example, may be accommodated by simply increasing the number of pet couplers that are attached to the harness. In such an instance, however, the cross member of the harness should be made longer, so as to accommodate an acceptable separation distance between all three pet couplers.

Larger numbers of pets, e.g., four pets, may also be harnessed by interconnecting three, two-position harnesses. In particular, the first harness may be swivel connected to the pet owner via the pet handler's coupler of the first harness. Pet handler's couplers of the second and third harnesses may then be swivel connected to the pet couplers of the first harness. Four pets may then be swivel connected to the pet couplers of the second and third harnesses to implement a 4-pet harness. It should be noted that more than four pets may be accommodated by the interconnection of multiple harnesses, and/or the addition of pet couplers to each harness as discussed in more detail below.

Turning to FIG. 1A, exemplary animal harness 100 is illustrated, whereby in a first embodiment, harness 100 may be constructed using a cylindrical steel rod. In other embodiments, rigid materials, such as aluminum or hard plastic, e.g., polyvinyl chloride (PVC), may be obtained and fashioned into a shape resembling harness 100. If cylindrical steel is used to fashion harness 100, then either a cold rolled, or a hot rolled, method may be used to fashion couplers 102 and 108. For example, a ⅜" cylindrical steel rod may be cold rolled to form circular shaped couplers 102 and 108, while larger diameter, e.g., ½" to ⅝", cylindrical steel rods may require hot rolled formation of circular shaped couplers 102 and 108. That is to say, in other words, that larger diameter steel rods may need to be heated in order to facilitate formation of circular shaped couplers 102 and 108.

In the illustrated embodiment of FIG. 1A, members 104 and 106 of harness 100 are arranged along axis 116 to form a substantially straight and rigid cross member. The length of members 104 and 106 may be selected depending upon the size of the animal that is to be harnessed. For example, each of members 104 and 106 may be sized to approximately six inches, given that small animals, such as Chihuahuas or dachshunds, are to be harnessed. In such an instance, a 12 inch separation is provided between the two pet couplers 108. The length of members 104 and 106 may be increased, as necessary, in order to accommodate larger animals. In particular, the length of members 104 and 106 is sized to provide enough separation between the harnessed animals so as to minimize the interference of one animal that may be caused by the other animal.

In any event, the length and rigidity of members 104 and 106 is operative to maintain a minimum separation distance between pet couplers 108. It should be noted that the rigidity of harness 100 should be set so as to maintain a substantially constant distance between each of pet couplers 108. That is to say, for example, that while the harness may be allowed to flex slightly under load, the harness should quickly return to its un-flexed configuration, whereby the original separation distance between pet couplers 108 is restored.

Pet handler's coupler 102 is interposed between pet couplers 108, such that the loop that forms pet handler's coupler 102 extends outward in a direction along axis 118 that is perpendicular to axis 116. Pet couplers 108 similarly extend perpendicularly along axis 118, except that the loops that form pet couplers 108 are inverted with respect to the loop that forms pet handler's coupler 102. Thus, pet handler's coupler 102 extends outward in a first direction that is orthogonal to axis 116, while pet couplers 108 extend outward in a second direction that is both orthogonal to axis 116 and opposite to the first direction.

Figure 1B:
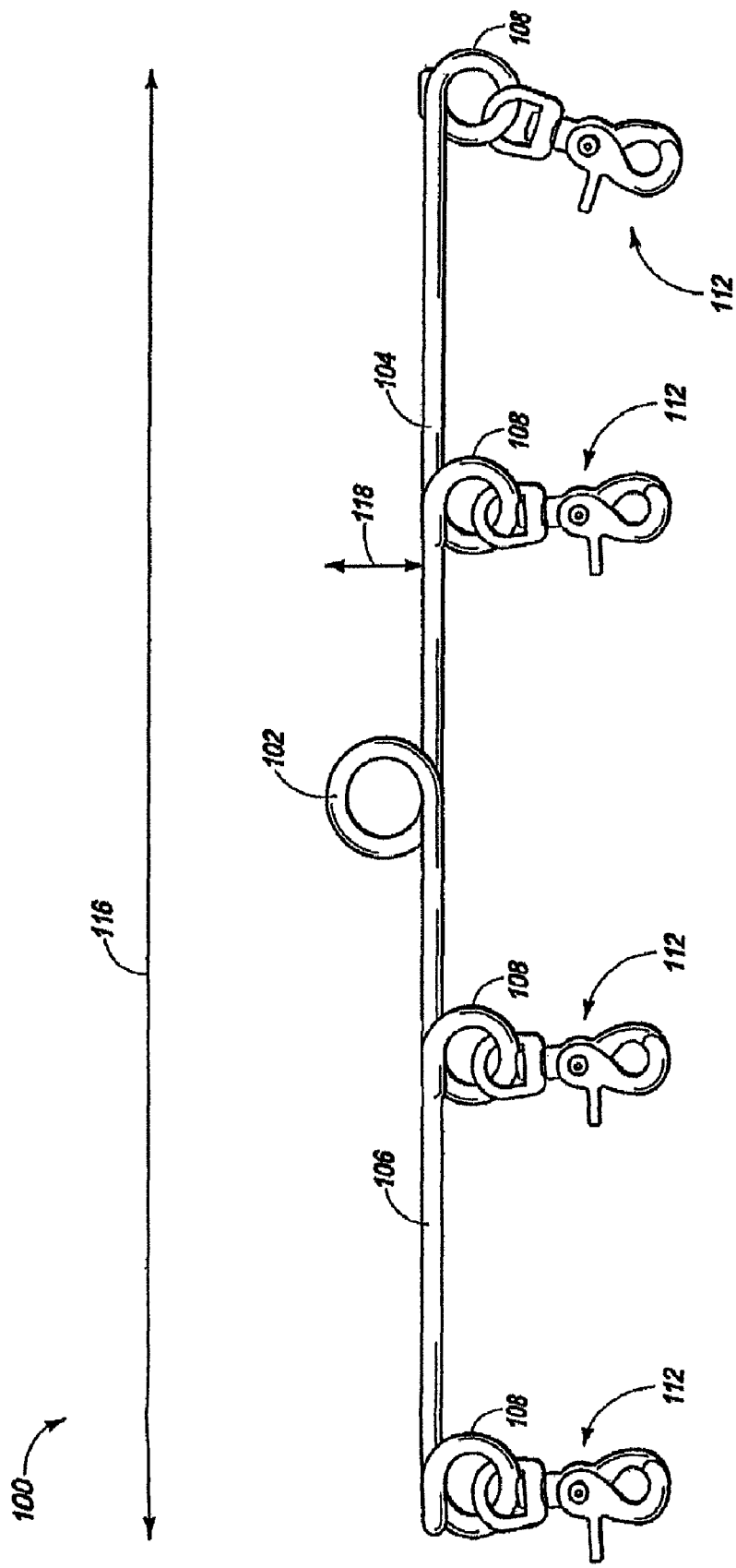
FIG. 1B exemplifies an alternate embodiment of a rigid harness.

In other embodiments, the number of pets harnessed may be increased to more than two, as exemplified in FIG. 1B. More than two pets, e.g., four pets, may be accommodated by simply increasing the number of couplers 108 that are attached to harness 100 as shown. In such an instance, the additional pet couplers may be attached in the same orientation as the other pet couplers 108, i.e., diametrically opposed to the orientation of pet handler's coupler 102. The cross member of harness 100 should be made longer, however, so as to accommodate an acceptable separation distance between each additional pet coupler.

Larger numbers of pets may also be harnessed by interconnecting multiple harnesses. In particular, a first harness 100 may be swivel connected to the pet handler via pet handler's coupler 102 of the first harness. Pet handler's couplers 102 of the second and third harnesses 100 may then be swivel connected to pet couplers 108 of the first harness. Four pets may then be swivel connected to the pet couplers of the second and third harnesses to implement a 4-pet harness. It should be noted that more than four pets may be accommodated by the interconnection of multiple harnesses, and/or the addition of pet couplers to each harness.

Figure 2:
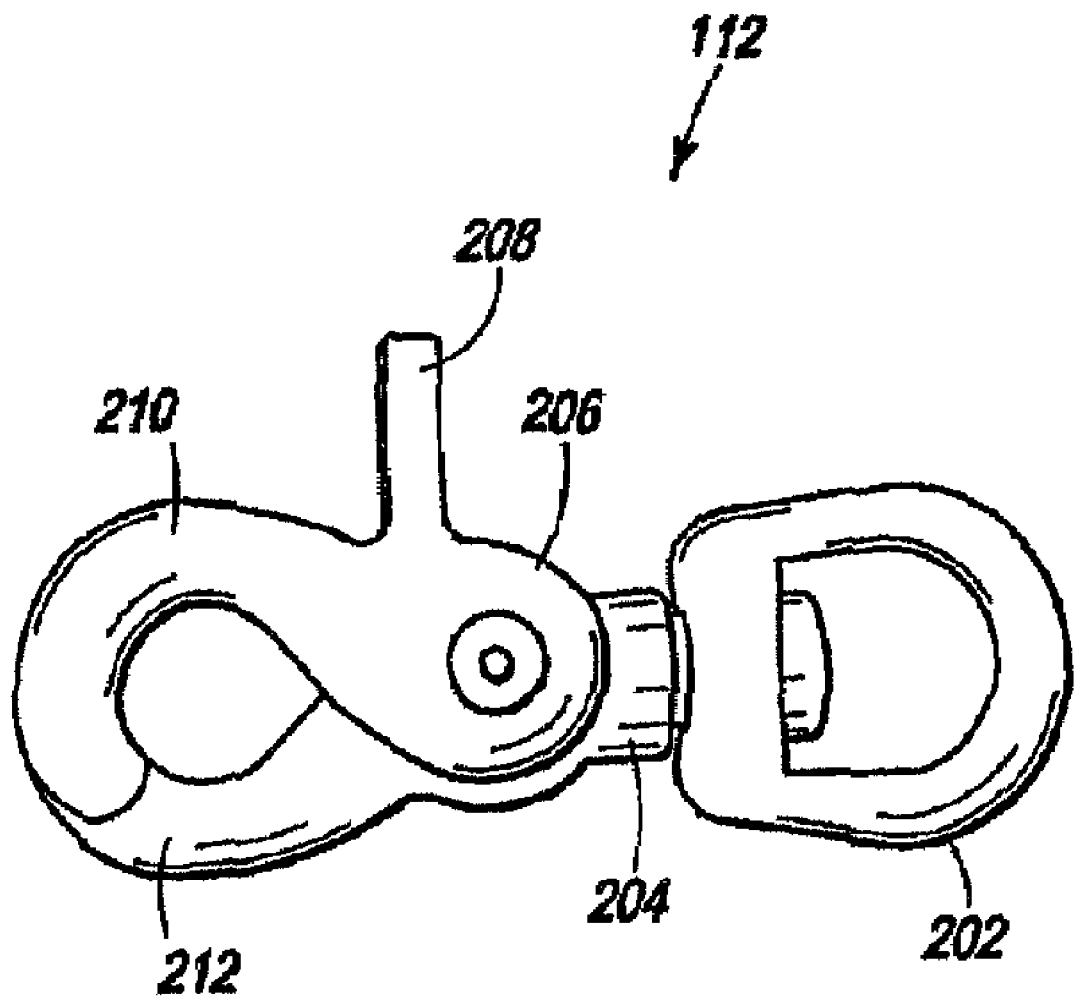
FIG. 2 exemplifies a swiveling clip mechanism that is used with the rigid harnesses of FIGS. 1A and 1B.

Turning to FIG. 2, a close-up view of swiveling clip mechanism 112 is exemplified. Swiveling clip mechanism 112 provides permanent loop 202, which is mounted to base 206 via post 204. Post 204 is flared on both ends so as to provide a stop mechanism for permanent loop 202. In operation, the stop mechanism of post 204 prevents permanent loop 202 from disengaging from base 206. In addition, post 204 does not engage permanent loop 202 in a rigid manner, which is to say that permanent loop 202 is allowed to swivel, or pivot, around post 204. Thus, the relative position of permanent loop 202 as compared to both post 204 and base 206 is allowed to rotate 360 degrees, which provides the swivel action of swiveling clip mechanism 112.

Attached to base 206 is a clip mechanism that includes clips 210 and 212. In the closed position as illustrated, clips 210 and 212 converge to form a temporary loop. Depression of trigger 208 causes clip 210 to recess away from clip 212. Once fully recessed, an opening exists between clips 210 and 212 such that, for example, the coupling mechanism of a pet collar may be inserted. Once inserted, trigger 208 may be released, thus causing clips 210 and 212 to once again converge, thereby locking the pet collar coupling mechanism into the temporary loop created by clips 210 and 212.

As discussed above, swiveling clip mechanism 112 may be permanently attached to pet couplers 108 of harness 100. To achieve a permanent connection, permanent loop 202 is caused to link with the loop portion of pet couplers 108 prior to their complete formation. That is to say, in other words, that swiveling clip mechanism 112 may be installed into pet couplers 108 by interlocking the loops of pet couplers 108 with permanent loop 202 prior to fully closing pet couplers 108.

Fully closing pet couplers 108 may involve various completion steps. For example, if harness 100 is constructed of steel, then fully closing pet couplers 108 may involve welding the overlapping portions of the loops together. If harness 100 is composed of aluminum, on the other hand, then fully closing pet couplers 108 may involve riveting the overlapping portions of the loops together. Fully closing pet couplers 108 may instead involve gluing the overlapping portions of the loops together should harness 100 instead be composed of a hard plastic such as PVC.

In an alternate embodiment, couplers 102 and 108 may be formed as separate components. In such an instance, members 106 and 104 may be formed as a continuous cross member and couplers 102 and 108 may then be mounted to the cross member at appropriate locations along a length of the cross member. Mounting of couplers 102 and 108 to the cross member may be accomplished by any of welding, clamping, riveting, gluing, etc. means as required by the material used for harness 100 and couplers 102 and 108.

Figure 3:
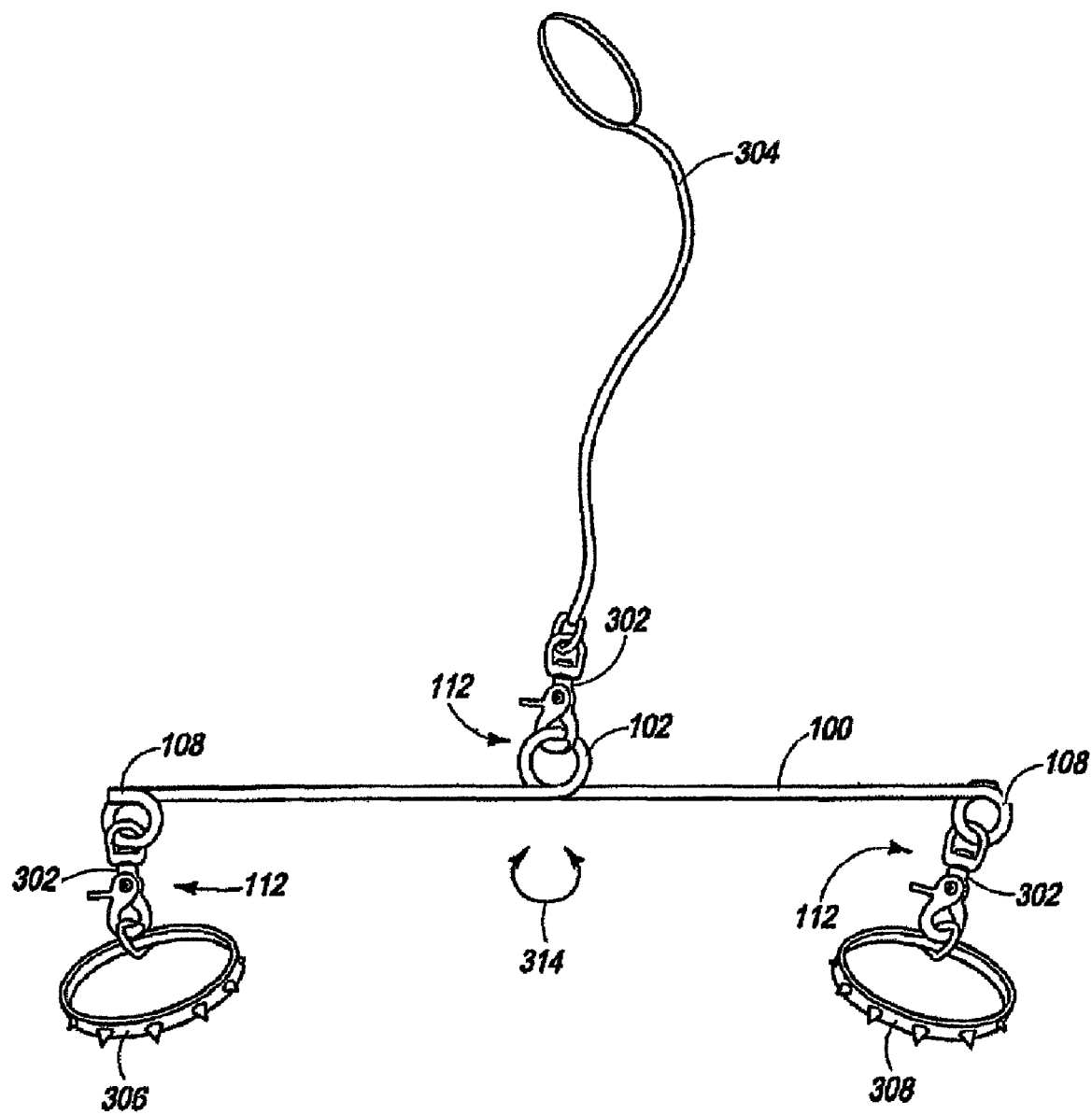
FIG. 3 exemplifies a harness assembly incorporating the rigid harness of FIG. 1A and the swiveling clip mechanisms of FIG. 2.

In operation, harness 100 may be used to enable the proximity control of multiple animals, while maintaining an acceptable separation distance between each animal and preventing entanglement of each animal during operation. Turning to FIG. 3, one illustration of the usage of a 2-pet harness is exemplified, whereby a pet owner establishes swiveled connection 302 using swiveling clip mechanism 112 between herself and pet handler's coupler 102 of harness 100 via leash 304. Similarly, the pet owner may establish swiveled connections 302 using swiveling clip mechanisms 112 between pet couplers 108 and pet collars 306 and 308, respectively. While out for a walk, pets (not shown) that are attached to collars 306 and 308, respectively, are leading the pet owner along a walking path, whereby the pet associated with collar 306 maintains its position generally to the side of the pet associated with collar 308.

Should the two pets suddenly exchange positions, the swiveled connection 302 at pet handler's coupler 102 enables harness 100 to rotate its position in either direction 314, so as to track each pet's position. Thus, the pet owner is not required to correct for the pets' movement, since harness 100 automatically rotates in either direction 314 to immediately correct for the changing positions of each pet. Thus, swiveled connection 302 at the end of leash 304 is a hub, which acts as a center of rotation for harness 100 during adjustment to the changing positions of each pet.

Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. An animal harness, comprising:
    a cross member having a length;
    a plurality of pet couplers attached to the cross member in a first orientation along the length of the cross member;
    a pet handler coupler attached to the cross member in a second orientation at a midpoint of the length of the cross member;
    a swiveled connection coupled to the pet handler coupler to allow rotation of the cross member about a hub established by the swiveled connection;
    a swiveling clip mechanism attached to the plurality of pet couplers; and wherein the first and second orientations are diametrically opposed to each other.

2. The animal harness of claim 1, wherein the length of the cross member is dependent upon a number of pet couplers attached to the cross member.

3. The animal harness of claim 2, wherein a separation distance between each pet coupler is proportional to the number of pet couplers attached to the cross member and the length of the cross member.

4. The animal harness of claim 1, wherein the cross member is composed of steel.

5. The animal harness of claim 4, wherein the plurality of pet couplers and the pet handler coupler are composed of steel.

6. The animal harness of claim 1, wherein the cross member is composed of aluminum.

7. The animal harness of claim 6, wherein the plurality of pet couplers and the pet handler coupler are composed of aluminum.

8. The animal harness of claim 1, wherein the cross member is composed of plastic.

9. The animal harness of claim 8, wherein the plurality of pet couplers and the pet handler coupler are composed of plastic.

10. The animal harness of claim 1, wherein each swiveling clip mechanism comprises:
    a base portion;
    a first loop coupled to the base portion, the first loop being adapted to rotate its position relative to the base portion; and
    a second loop coupled to the base portion.

11. The animal harness of claim 10, wherein the second loop comprises:
    a first clip attached to the base portion;
    a second clip attached to the base portion; and
    wherein the first clip is adapted to recess away from the second clip to form a temporary gap between the first and second clips.

12. A multiple animal harness assembly, comprising:
    a rigid cross member;
    a plurality of pet couplers attached to the rigid cross member;
    a plurality of swiveling clip mechanisms attached to each of the plurality of pet couplers;
    a pet handler coupler attached to a midpoint of the rigid cross member
    a leash having a first end coupled to the pet handler coupler; and
    wherein the rigid cross member is adapted to rotate about a hub established at the first end of the leash.

13. The multiple animal harness assembly of claim 12, wherein the first end of the leash comprises a swiveling clip mechanism.

14. The multiple animal harness assembly of claim 12, wherein a length of the rigid cross member is dependent upon a number of pet couplers attached to the rigid cross member.

15. The multiple animal harness assembly of claim 14, wherein a separation distance between each pet coupler is proportional to the number of pet couplers attached to the rigid cross member and the length of the rigid cross member.

16. The multiple animal harness assembly of claim 12, wherein the rigid cross member is composed of steel.

17. The multiple animal harness assembly of claim 16, wherein the plurality of pet couplers and the pet handler coupler are composed of steel.

18. The multiple animal harness assembly of claim 12, wherein the rigid cross member, the plurality of pet couplers, and the pet handler coupler are composed of aluminum.

19. The multiple animal harness assembly of claim 18, wherein the second loop comprises:
    a first clip attached to the base portion;
    a second clip attached to the base portion; and
    wherein the first clip is adapted to recess away from the second clip to form a temporary gap between the first and second clips.

20. The multiple animal harness assembly of claim 12, wherein each swiveling clip mechanism comprises:
    a base portion;
    a first loop coupled to the base portion, the first loop being adapted to rotate its position relative to the base portion; and
    a second loop coupled to the base portion.

\* \* \* \* \*